(12) United States Patent
Gopfert et al.

(10) Patent No.: US 8,135,638 B2
(45) Date of Patent: Mar. 13, 2012

(54) SUMMARIZING RISK RATINGS TO FACILITATE AN ANALYSIS OF RISKS

(75) Inventors: Arthur Gilbert Gopfert, Suwanee, GA (US); Dennis Christopher Rogers, Cumming, GA (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 11/118,272

(22) Filed: Apr. 29, 2005

(65) Prior Publication Data
US 2006/0247957 A1    Nov. 2, 2006

(51) Int. Cl.
G06Q 40/00 (2006.01)
(52) U.S. Cl. .................................. 705/35; 705/10; 705/7
(58) Field of Classification Search ................ 705/7, 10, 705/35
See application file for complete search history.

(56) References Cited

U.S. PATENT DOCUMENTS

| 6,859,788 | B1 | 2/2005 | Davey | |
| 7,433,829 | B2* | 10/2008 | Borgia et al. | 705/7 |
| 2002/0059093 | A1* | 5/2002 | Barton et al. | 705/10 |
| 2003/0125997 | A1* | 7/2003 | Stoltz | 705/7 |

* cited by examiner

Primary Examiner — Samica L Norman
(74) Attorney, Agent, or Firm — Schmeiser, Olsen & Watts; Anna Linne

(57) ABSTRACT

A method and system for summarizing risk ratings to facilitate an analysis of risks. Items related by a common business function, risks associated with each item, sub-categories of risks, and categories of risks are weighted. For each item, each associated risk is evaluated by comparing responses on a questionnaire to predetermined acceptable answers. A first summarized risk rating based on weights of risks, a sub-category, a category, and an item is calculated. A second summarized risk rating based on weights of risks, the sub-category, and the item is calculated. A first summary report that includes a hyperlink and the first summarized risk rating is displayed. In response to selecting the hyperlink, a second summary report that includes the second summarized risk rating is automatically displayed. Actions are performed to mitigate risks in response to determining that the first and second summarized risk ratings exceed predetermined values.

4 Claims, 11 Drawing Sheets

| RISK EVALUATION QUESTIONNAIRE | | | | | |
|---|---|---|---|---|---|
| APPLICATION: | CANADA | | APPLICATION FAMILY: | PERSONAL SOLUTIONS | |
| CATEGORY | SUBCATEGORY | MEASUREMENT | DEFINITION | VALUE | ACCEPTABLE? |
| REDUNDANCY AND RECOVERY | APPLICATION BACKUP | FREQUENCY | IS A FREQUENCY DEFINED AND WHAT IS IT? | N | FAIL |
| FAIL | | FULL/PARTIAL | IS THE BACKUP FULL OR PARTIAL? | N | FAIL |
| | | MEDIA | WHAT MEDIA IS USED FOR THE BACKUP? | N | FAIL |
| | COMPONENT REDUNDANCY | DISK | IS THE DISK MIRRORED? | N | FAIL |
| | | POWER | IS THERE MULTIPLE POWER SUPPLIES WITHIN THE SERVER? | Y | PASS |
| | | NET CONNECTION | DOES THE BOX HAVE MULTIPLE NETWORK CONNECTIONS? | N | FAIL |
| | | FAILOVER (AUTO/MANUAL) | IS THERE FAILOVER AND IS IT AUTO OR MANUAL? | N | FAIL |
| | CONFIGURATION BACKUP | Y/N | IS THERE A CONFIGURATION BACKUP? | N | FAIL |
| | DATABASE BACKUP | FREQUENCY | IS A FREQUENCY DEFINED AND WHAT IS IT? | WEEKLY | PASS |
| | | FULL/PARTIAL | IS THE BACKUP FULL OR PARTIAL? | FULL/PARTIAL | PASS |
| | | MEDIA | WHAT MEDIA IS USED FOR THE BACKUP? | TAPE | PASS |
| | NETWORK REDUNDANCY | Y/N | IS THERE REDUNDANT NETWORK CONNECTIONS TO THIS SERVER? | N | FAIL |
| | POWER REDUNDANCY | Y/N | ARE THE POWER CONNECTIONS REDUNDANT TO THIS THIS SERVER? | Y | PASS |
| | SERVER REDUNDANCY | EXACT HARDWARE MATCH? | IS THERE A BACKUP SYSTEM IN PLACE WITH AN EXACT HARDWARE MATCH TO THIS SERVER? | N | FAIL |
| | | FAILOVER (AUTO/MANUAL) | IS THERE FAILOVER AND IS IT AUTO OR MANUAL? | N | FAIL |
| | | CURRENT UTILIZATION | WHAT IS THE CURRENT UTILIZATION OF THE FAILOVER SERVER? | N | FAIL |
| | DISASTER RECOVERY AND HELP DESK | IBM SINGLE POINT OF CONTACT | IS IBM'S HELP DESK THE SINGLE POINT OF CONTACT? | N | FAIL |
| | | DR TIER 1 | IS THIS CONSIDERED A TIER 1 APPLICATION? | N | FAIL |
| | | DR TIER 2 | IS THIS CONSIDERED A TIER 2 APPLICATION? | N | FAIL |

FIG. 4A

<< Back  Refresh  Stop  Report (F7)   SAT Drill-Down Score View Canada's Application Details Status

[Figures] = Total nos of Failed Applications, (Figures %) = Scores % or weights, normal figures = Total nos of failures in transactions. Color: Red=Fail, Green=Pass, Amber=Not Collected <u>Formula>></u>

| System Assurance Categories | Subcategories | Measurement | Definition | Value | Acceptable ? |
|---|---|---|---|---|---|
| Redundancy and Recovery | Application Backup | Media | What media is used for the backup? | N | Fail (6) |
| *Fail* | | Frequency | Is a frequency defined and what is it? | N | Fail (5) |
| | | Full/Partial | Is the backup full or partial? | N | Fail (5) |
| | Component Redundancy | Power | Is there multiple power supplies within the server? | Y | Pass (7) |
| | | Failover (auto/manual) | Is there failover and is it auto or manual? | N | Fail (6) |
| | | Disk | Is the disk mirrored? | Y | Pass (5) |
| | | Net Connection | Does the box have multiple network connections? | N | Fail (3) |
| | Configuration Backup | Yes/No | Is There a Configuration backup? | No | Fail (9) |
| | Database Backup | Backup/Media | What media is used for the backup? | DISK | Pass (8) |
| | | Backup/Frequency | Is a frequency defined and what is it? | Y | Pass (6) |
| | | Backup–Full/Partial | Is the backup full or partial? | Full/Partial | Pass (5) |
| | Network Redundancy | Nyes/Nno | Is there redundant network connections to this server? | N | Fail (6) |
| | Power Redundancy | Y/N | Is there a configuration backup? | Y | Pass (12) |
| | Server Redundancy | Current Utilization | What is the current utilization of the failover server? | 11 | Fail (12) |
| | | SR/Failover (auto/ma... | Is there failover and is it auto or manual? | N | Fail (9) |
| | | Exact Hardware Matc... | Is there a backup system in place with an exact hardware ... | N | Fail (3) |
| | Disaster Recovery | IBM Single Point of C... | Is IBM's help desk the single point of contact? | N | Fail (9) |
| | | DR Tier 2 | Is this considered a tier 2 application? | N | Fail (4) |
| | | DR Tier 1 | Is this considered a tier 1 application? | N | Fail (1) |
| Monitoring and Planning | Application Monitoring | Up/Down | Is up/down status measured? | Y | Pass (9) |
| *Fail* | | AM/Response Time | Is application response time measured? | Y | Pass (7) |
| | Capacity Planning | Memory | Is capacity planning performed for the memory? | N | Fail (7) |

SUMMARIZING RISK RATINGS TO FACILITATE AN ANALYSIS OF RISKS

BACKGROUND OF THE INVENTION

1. Technical Field

The present invention relates to a method and system for facilitating risk analysis, and more particularly to a technique for grouping risks and items associated with risks, assigning weights thereto, and calculating and summarizing risk ratings to facilitate an analysis of the risks.

2. Related Art

Conventional techniques for risk analysis lack a standard process for summarizing risk-related information to facilitate analysis of risks, and are limited in that they are suitable for a single risk resolution approach. Thus, there is a need for an improved technique for facilitating analysis of risks associated with a business enterprise.

SUMMARY OF THE INVENTION

In first embodiments, the present invention provides a computer-implemented method of summarizing risk ratings to facilitate an analysis of risks. The method comprises:

weighting, by a computing system, each item of a plurality of items and each family of a plurality of families, wherein each family of the plurality of families includes one or more items of the plurality of items, and wherein the plurality of items are related to each other by a common functionality associated with a business enterprise;

weighting, by the computing system, each risk of a plurality of risks, each sub-category of a plurality of sub-categories and each category of a plurality of categories, the weighting of each risk determining a weight for each risk, wherein each category of the plurality of categories includes one or more sub-categories of the plurality of sub-categories, and wherein the plurality of risks is associated with each item of the plurality of items;

generating, by the computing system, a questionnaire report that includes a plurality of questions, wherein the plurality of risks is formulated as the plurality of questions, and wherein the questions of the plurality of questions are associated with predetermined answers of a plurality of predetermined answers;

evaluating, by the computing system, the plurality of risks for each item of the plurality of items, wherein the evaluating includes:

receiving a plurality of responses for the plurality of questions, wherein the plurality of responses is associated with an item of the plurality of items;

comparing the plurality of responses to the plurality of predetermined answers;

determining that one or more responses of the plurality of responses are acceptable based on a result of comparing the plurality of responses, wherein the questionnaire report associates the one or more responses with one or more risks of the plurality of risks, and wherein the one or more risks are included in a category of the plurality of categories; and setting one or more pass indications on the questionnaire report in response to determining that the one or more responses are acceptable, wherein the questionnaire report associates the one or more pass indications with the one or more risks;

calculating, by the computing system, a first summarized risk rating summarized by the category, wherein the first summarized risk rating summarized by the category is included in a first set of summarized risk ratings that are associated with the item and with the plurality of categories, wherein the first summarized risk rating summarized by the category includes a weighted percentage of the one or more pass indications, wherein the first summarized risk rating summarized by the category is a first weight of the category multiplied by a sum of one or more summarized risk ratings for a set of one or more sub-categories included in the category, wherein a summarized risk rating for a sub-category of the set of one or more sub-categories is included in the one or more summarized risk ratings for the set of one or more sub-categories and is a second weight of the sub-category multiplied by a risk rating of the item, wherein the risk rating of the item is a third weight of the item multiplied by a sum of one or more weights of a subset of the one or more risks, wherein the questionnaire report associates the subset of the one or more risks with a subset of the one or more pass indications, wherein the subset of the one or more risks is included in the sub-category, wherein the first weight and the second weight are a result of weighting each sub-category of the plurality of sub-categories and each category of the plurality of categories, and wherein the third weight is a result of weighting each item of the plurality of items;

displaying, by the computing system, a first summary report, wherein the first summary report includes the first summarized risk rating and other summarized risk ratings of the first set of summarized risk ratings, wherein the first summary report groups the summarized risk ratings of the first set of summarized risk ratings by the categories of the plurality of categories, wherein the first summary report includes a hyperlink, and wherein a result of displaying the first summary report is a first analysis by a first team consisting of a first plurality of persons whose responsibility is to meet a plurality of objectives of the business enterprise using the plurality of items pre-identified by the first team as being in a scope of an evaluation of the plurality of risks;

receiving, by the computing system and subsequent to the displaying of the first summary report, a selection of the hyperlink;

calculating, by the computing system, a second summarized risk rating summarized by the sub-category, wherein the second summarized risk rating summarized by the sub-category is included in a second set of risk ratings that are associated with the item and with the plurality of sub-categories, wherein the second summarized risk rating summarized by the sub-category includes a weighted percentage of the subset of the one or more pass indications, and wherein the second summarized risk rating summarized by the sub-category is the second weight of the sub-category multiplied by the risk rating of the item;

automatically displaying, by the computing system and in response to receiving the selection of the hyperlink, a second summary report, wherein the second summary report includes the second summarized risk rating and other summarized risk ratings of the second set of summarized risk ratings, wherein the second summary report groups the summarized risk ratings of the second set of summarized risk ratings by the sub-categories of the plurality of sub-categories, wherein a result of automatically displaying is a second analysis by a second team consisting of a second plurality of persons whose responsibility is to identify and evaluate the plurality of risks, wherein the plurality of risks is specific to the scope, and wherein the first team is different from the second team;

determining the first summarized risk rating is greater than a first predetermined value based on the first analysis;

determining the second summarized risk rating is greater than a second predetermined value based on the second analysis;

in response to determining the first summarized risk rating is greater than the first predetermined value, performing a first action so as to mitigate a first risk of the one or more risks and to decrease the first summarized risk rating to an updated first summarized risk rating that is less than or equal to the first predetermined value; and in response to determining the second summarized risk rating is greater than the second predetermined value, performing a second action so as to mitigate a second risk of the subset of the one or more risks and to decrease the second summarized risk rating to an updated second summarized risk rating that is less than or equal to the second predetermined value.

A system, computer program product, and process for supporting computing infrastructure corresponding to the above-summarized method are also described and claimed herein.

Advantageously, the present invention provides a method and system that facilitates analysis of risks by providing flexible, multi-dimensional summaries based on various selectable combinations of items or item families/sub-families and risks or risk categories/sub-categories, thereby providing multiple levels of detail which facilitate risk analysis using a wide range of approaches (e.g., a broad, strategic approach or a very detailed, tactical approach) by a wide range of users (e.g., executives to operational level personnel).

BRIEF DESCRIPTION OF THE DRAWINGS

FIG. 3 depicts an example of a risk evaluation questionnaire employed to implement a risk evaluation step in the logic of FIG. 2A, in accordance with embodiments of the present invention.

FIGS. 4A-4F depict screen captures of reports which include risk rating information to facilitate risk analysis, wherein the reports are generated in a summary report generation step of FIG. 2A, in accordance with embodiments of the present invention.

DETAILED DESCRIPTION OF THE INVENTION

Figure 1A:
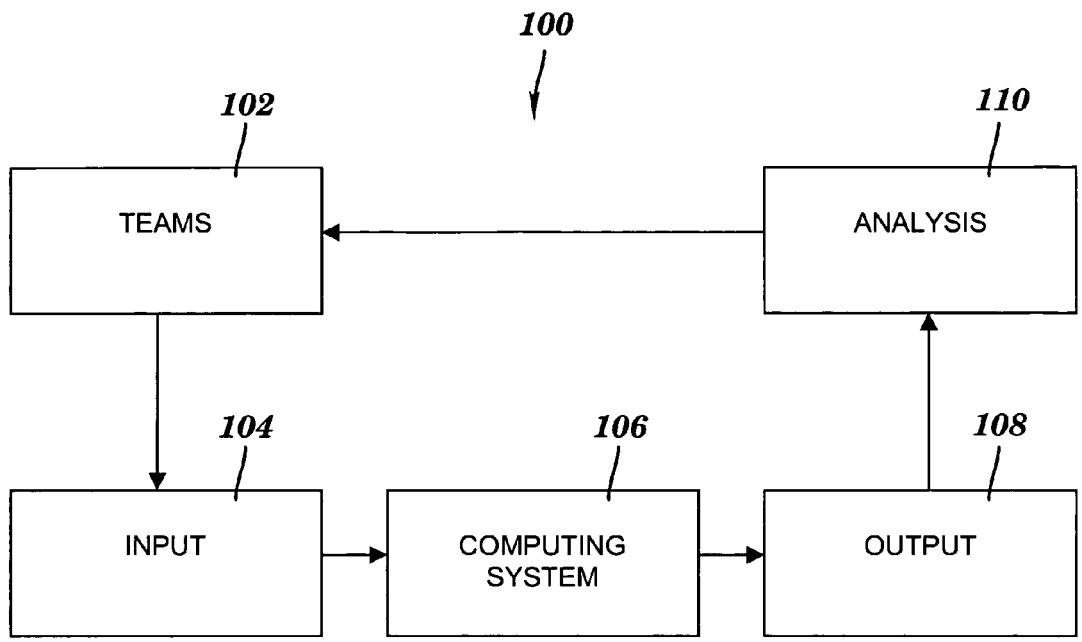
FIG. 1A is a block diagram of a system for facilitating analysis of risks, in accordance with embodiments of the present invention.

FIG. 1A is a block diagram of a system for facilitating analysis of risks, in accordance with embodiments of the present invention. System 100 comprises teams 102, which provide input 104 related to facilitating analysis of risk. Input 104 includes, for example, an identification of items and risks, groupings of items and risks, and assignments of weights to items, risks, and groupings thereof. As used herein, an item is defined to be any element of an organization or business that is associated with risks to be evaluated. For example, a computer server associated with risks related to the server's redundancy features can be identified as an item in the context of the present invention. As used herein, a risk is defined as an attribute that is capable of causing a negative effect to an organization or business that is responsible for managing the risk. For example, a lack of redundant network connections to a computer server can be identified as a risk to a company that owns a midrange computer server infrastructure and is responsible for evaluating redundancy related to its computer servers. Further, risk factors and risk criteria are used herein to refer to risks.

A computing system 106 receives input 104 to calculate and summarize data in output 108 related to facilitating risk analysis (e.g., risk ratings, as described below). An analysis 110 of output 108 follows generation of output 108. The analysis may be performed by one or more members of teams 102, and provides a basis for deciding what actions are to be performed to mitigate risks (i.e., decrease the number of risks or eliminate risks). Risk mitigating actions are performed, for example, by one or more of teams 102.

Figure 1B:
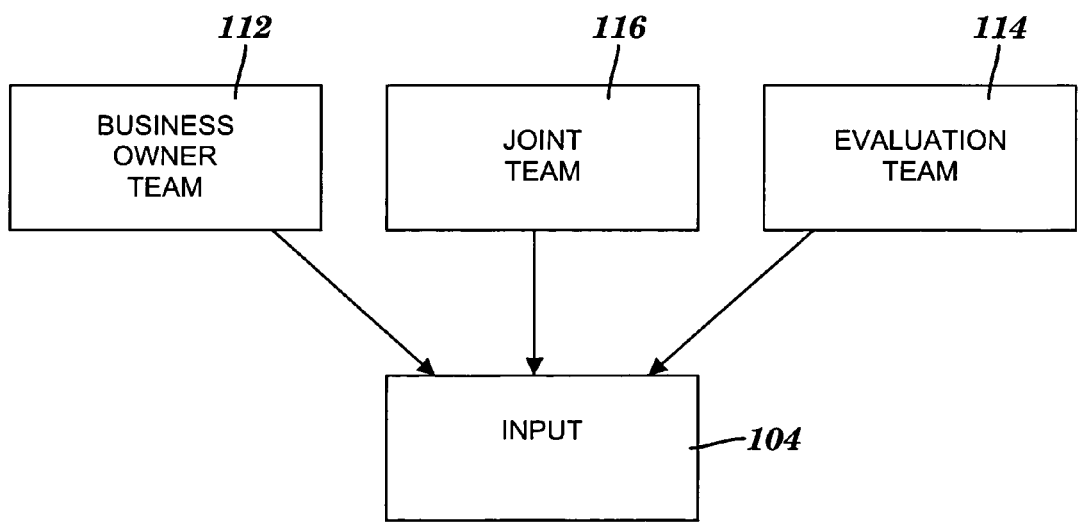
FIG. 1B is a block diagram illustrating details of a part of the system of FIG. 1A, in accordance with embodiments of the present invention.

FIG. 1B is a block diagram illustrating details of a part of the system of FIG. 1A, in accordance with embodiments of the present invention. Teams 102 (see FIG. 1A) providing input 104 include, for example, a business owner team 112, an evaluation team 114 and a joint team 116. Business owner team 112 comprises persons of a business enterprise responsible for meeting business objectives using items identified as "in scope" of an evaluation of risks. As used herein, a scope is defined as a set of items that are at least functionally related (e.g., perform the same or similar functions). Items in one example of a scope are identified to be computing units that are related by their similar functionality as computer servers. In addition to the functional relationship of items, the scope can impose other requirements on items. For example, items in a scope may be required to have similar support requirements (e.g., a set of computer servers further limited by the requirement that they must be supported locally). As another example, items in a scope may be required to be managed in a similar manner (e.g., a set of computer servers further limited by the requirement that they must be managed by a specific company).

Business owner team 112 may include multiple sub-teams (e.g., a management team and a technical team). In one embodiment, the business owner team primarily addresses management of the business and technical environments under review. Although a business enterprise is employed to illustrate aspects of the system and method of facilitating of risk analysis described herein, the present invention contemplates other, non-business organizations that are responsible for managing risks.

Evaluation team 114 comprises persons responsible for identifying and evaluating risks specific to the scope identified by the business owner team. The evaluation team is primarily comprised of persons with technical skills and ability, but may also include management. Evaluation team 114 can be internal or external to the business enterprise that includes the business owner team. Evaluation team 114 is selected, for example, based on experience with the scope identified by business owner team 112.

Joint team 116 comprises a combination of subsets of both business owner team 112 and evaluation team 114. Joint team 116 brings together input 104 from business owner team 112 and evaluation team 114 and reviews results of evaluation team 114.

Figure 2A:
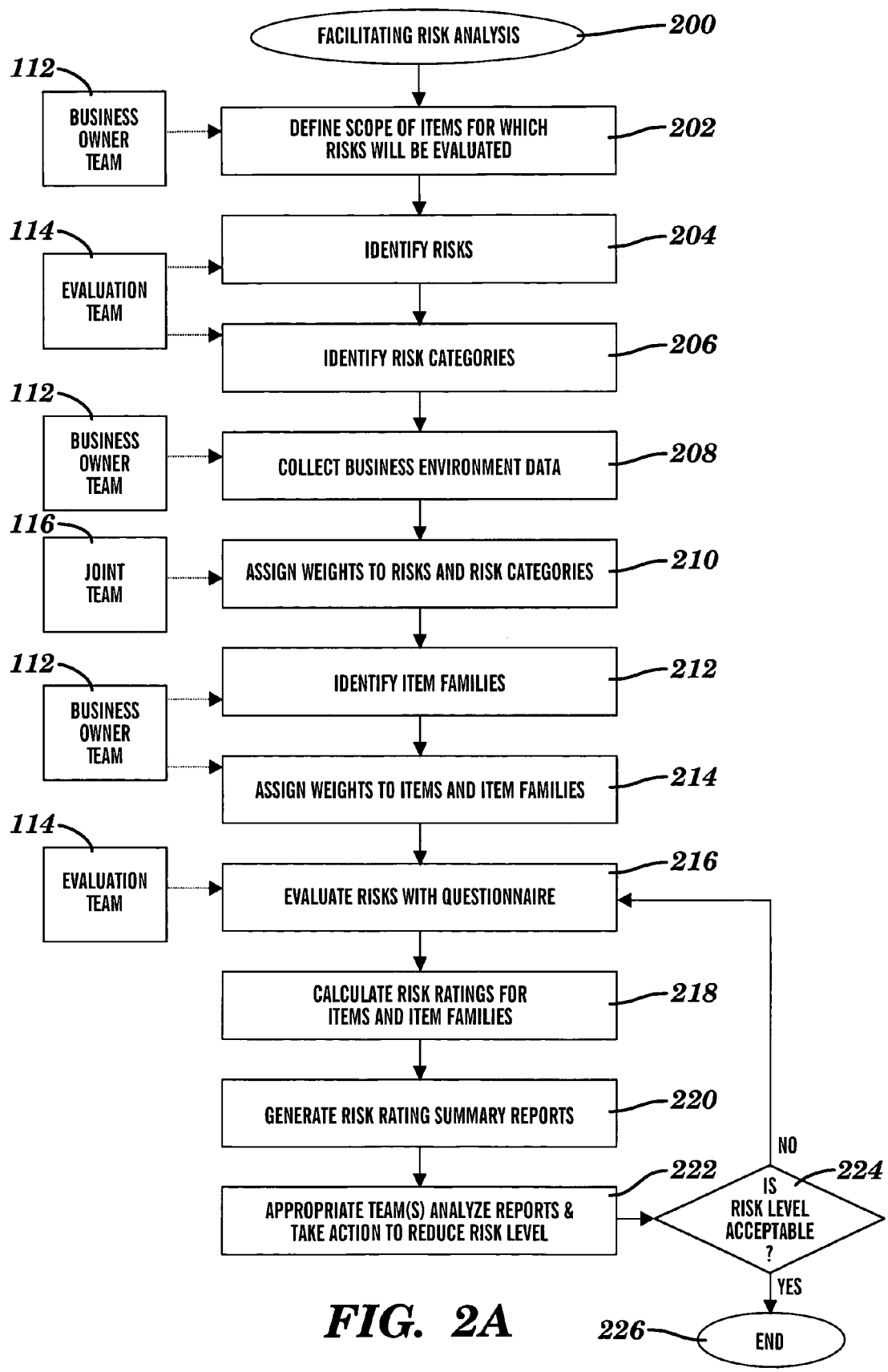
FIG. 2A is a flow chart of logic for facilitating analysis of risks for the system of FIG. 1A, in accordance with embodiments of the present invention.

FIG. 2A is a flow chart of logic for facilitating analysis of risks for the system of FIG. 1A, in accordance with embodiments of the present invention. The logic for facilitating analysis of risks begins at step 200. In step 202, items for which risks will be evaluated are identified as being included in a defined scope. Items in the scope are related at least by a common functionality, and can be, for example, people, computers, rooms, buildings, software applications, etc. Again, in addition to the common functionality of items in a scope, the scope can be more narrowly defined by imposing a relationship between items based on the items having similar support requirements or the items being managed in similar fashions. In one embodiment, as shown in FIG. 2A, business owner team 112 performs the identification of items in step 202. In another embodiment, evaluation team 114 and business owner team 112 identify the items.

In step 204, risks (i.e., risk factors or risk criteria) are identified by, for example, evaluation team 114. In one example, evaluation team 114 identifies risks based on technical knowledge and technical experience. The identified risks are associated with the items identified in step 202. Risks may be, for instance, physical (e.g., number of network cards), logical (e.g., amount of disk storage), environmental (e.g., number of power suppliers), or another type determined to be relevant by the business enterprise. In one embodiment, each identified risk is formulated in the form of a question. For example, a risk associated with a server, and which is related to network redundancy is formulated as the question: Are there redundant network connections to this server? These questions are included in a questionnaire described below relative to step 216 and acceptable responses to the questions are, for example, predetermined primarily by evaluation team 114.

In step 206 multiple risk categories are identified by, for example, evaluation team 114. Risks identified in step 204 are grouped into the identified risk categories based on the how the risks are related. In one embodiment, each risk category is part of a hierarchy that includes multiple sub-categories included within each risk category. The sub-categories of risk are included at one or more hierarchy levels below the hierarchy level of the categories. For example, lower level sub-category groupings include closely related technical risks, while higher level groupings include more loosely related risks. The grouping of risks into categories and sub-categories facilitates summarization and reporting, which is described below relative to step 220.

In step 208, business environment data is collected and provided by, for example, business owner team 112. As used herein, a business environment is defined as the setting in which business owner team 112 operates, and business environment data is defined as information used to prioritize risks and items. Examples of business environment data include customer abilities, physical location, available funding, and strategic direction of the business. For example, based on a strategic direction of their business, a company decides that protecting their data is a primary concern. In this example, the business environment data concerning data protection is subsequently used (see step 210) to weight more highly a risk related to having a written security policy regarding data management as compared to a risk related to having documentation regarding the layout of the home page of the company's website, because the former risk relates to the business's primary concern of data protection.

In step 210, a weight is assigned to each risk identified in step 204, and to each category and sub-category identified in step 206. Weights are assigned to prioritize risks and risk categories and sub-categories, and to facilitate the summarization and reporting in step 220, described below. For example, if category A is assigned a weight of 2, then risk-related summaries broken down by category would multiply a value to be summarized in category A by 2 (i.e., the weight assigned to category A) (see step 220 below). The assigned weights are determined by, for instance, joint team 116. In one embodiment, the assigned weights are based on, for example, the level of impact each risk, sub-category and category has on the business. That is, the greater the risk's negative impact to the business, the greater the weight assigned to the risk. For example, if the joint team deems risk A to have twice the impact on revenue as compared to risk B, then risk A is assigned a weight of 2 and risk B is assigned a weight of 1.

Weights can be objectively determined by employing associated revenue, costs, historical performance, and customer satisfaction ratings. Weights can also be subjectively determined. The values selected for weights are not restricted by type and may vary in type among the levels of category, sub-category and risk. Types of weight values can be, for example, numbers in a predetermined range (e.g., the integers 1-10), or amounts based on revenue earned by business units. Further, for a set of risks, sub-categories, or categories, weights assigned thereto are not required to have unique values.

Multiple groupings (e.g., families) of items are identified in step 212. Item families are identified by, for example, business owner team 112. In one example, item family identification is determined by management personnel within business owner team 112. Items identified in step 202 are grouped into the identified item families based on the how the items are related within the business environment. As examples, relationships between items that determine item families include management structure, customer demographics, and technical needs. In one embodiment, each item family is part of a hierarchy that includes multiple groupings (e.g., sub-families) branching from each item family. The sub-families of items are included at one or more hierarchy levels below the hierarchy level of the families. For example, lower level sub-family groupings include closely related items, while higher level groupings include more loosely related items. The grouping of items into families and sub-families facilitates summarization and reporting, which is described below relative to step 220.

In step 214, a weight is assigned to each item identified in step 202, and to each family and sub-family identified in step 212. Weights in step 214 are assigned to prioritize items, sub-families and families, and to facilitate the summarization and reporting in step 220, as described below. The assigned weights in step 214 are determined by, for instance, business owner team 112. In one embodiment, the assigned weights of step 214 are based on, for example, the importance of each item, sub-family and family relative to the business. For instance, the greater the item's business importance, the greater the weight assigned to the item. As one example, if the business owner team deems family A to have twice the impact on revenue as compared to family B, then family A is assigned a weight of 2 and family B is assigned a weight of 1.

Weights can be objectively determined by employing associated revenue, costs, historical performance, and customer satisfaction ratings. Weights can also be subjectively determined based on, for instance, management preference and future business plans. The values of weights and types of weight values described above relative to step 210 also apply to the weights assigned in step 214.

Risks associated with each item are evaluated in step 216. In one embodiment, risk evaluation is completed by evaluation team 114 via questionnaires that are created using the risks identified in step 204, with one questionnaire corresponding to each item identified in step 202. In each questionnaire, risks are formulated as questions with predetermined acceptable responses, as described above. As one example, a questionnaire is presented on a spreadsheet and responses are provided via the spreadsheet by evaluation team 114. Responses on each questionnaire are compared to the predetermined acceptable responses. For example, the spreadsheet indicates "pass" if a response is acceptable, and "fail" for all other responses.

Questionnaire 300 of FIG. 3 is one example of a questionnaire that can be used to evaluate risks in step 216 of FIG. 2A, in accordance with embodiments of the present invention. In FIG. 3, the item identified in step 202 is an application. Questionnaire 300 in FIG. 3 includes risks formulated as questions in the Definition column. Responses to the questions are in the Value column. The column labeled "Acceptable?" indicates acceptable responses as Pass and other responses as Fail, as described above. Other columns include a measurement characterizing the question and response, as well as the category and subcategory of the each risk. Again, FIG. 3 is merely an example, and it will be apparent to one skilled in the art that other questions are to be used on the questionnaire if the item or risks differ from those presented in the FIG. 3 example.

Returning to FIG. 2A, in step 218, risk ratings are calculated for items and item families and sub-families. A risk rating is a value calculated for an item, sub-family or family that indicates a total or rate (e.g., a percentage) of Fail or Pass indications associated with the item, sub-family or family. The risk rating may or may not be weighted. For example, a risk rating for an item is calculated by (1) summing the weights of the risks which are associated with a Fail indication, and which are associated with the item for which the risk rating is calculated, and (2) multiplying the resulting sum by the weight assigned to the item. A risk rating for a family with no sub-families is calculated, for example, by (1) summing the risk ratings for each item in the family, calculated as described above, and (2) multiplying the resulting sum by the weight assigned to the family. Another type of risk rating can be calculated using the same procedure described above, but using associated risks with a Pass indication rather than a Fail indication. Risk rating calculations are performed by, for example, computing system 106 (see FIG. 1A).

In step 220, risk ratings for items, sub-families and families are summarized by a single risk rating (a.k.a. summarized risk rating) or by multiple risk ratings (a.k.a. summarized risk ratings) grouped by the categories and/or sub-categories identified in step 206. Hereinafter, summarizing by multiple risk ratings grouped by category (or sub-category) is referred to simply as summarizing by category (or sub-category). To calculate a summarized risk rating summarized by sub-category, the risk rating for a selected item, sub-family or family is multiplied by the weight assigned to the sub-category. To calculate a summarized risk rating summarized by category, the summarized risk ratings for the sub-categories of the category are calculated and summed, and the result is multiplied by the weight assigned to the category.

Reports or onscreen views are generated to show risk ratings summarized in selectable combinations of item/sub-family/family and risk/sub-category/category. Examples of these combinations include: (1) a single item's risk ratings for individual risks associated with the item, the risks being grouped by sub-category and category (see screen 400 in FIG. 4A); (2) a single item's risk ratings for each sub-category, with the sub-categories grouped by category (see screen 410 in FIG. 4B); (3) risk ratings for each item in a family of items, the risk ratings summarized by category (see screen 420 in FIG. 4C); (4) risk ratings for each family, the risk ratings being summarized by category (see screen 430 in FIG. 4D); and (5) total risk ratings for each family (see screen 440 in FIG. 4E).

In addition to risk ratings, reports generated in step 220 can include, for example, a number of items (i.e., failed items) having at least one Fail indication associated therewith, totaled for each family or sub-family of items. Further, this number of failed items can be broken down by category or sub-category. As another example, a report can display a pass percentage (or fail percentage) indicating the percentage of Pass (or Fail) indications for an item or family/sub-family, summarized by category or sub-category. Examples of pass percentages are shown below relative to FIGS. 4B-4E.

Other types of reports can be generated that rank items, sub-families, families, risks, sub-categories, and categories by their respective weights. For example, a comparative performance analysis report can be generated that orders categories by their assigned weights and displays a percentage of "fail" indications for risks in each category as compared to the total number of risks included in the respective category (see screen 450 in FIG. 4F). Further, other reports display items and their family/sub-family groupings in order of weights assigned, with the greatest weights given greatest emphasis.

Summary reports generated in step 220 can be created and viewed (e.g., on a computer display screen) via a software program that resides, for example, on computing system 106 (see FIG. 1A). The software program provides easy access to a high level summary and the ability to "drill down" from the high level summary to display a series of more detailed summaries. Features of onscreen reports can include hyperlinks whereby clicking on a hyperlink switches the report to a more or less detailed view. For example, clicking on a hyperlink associated with a single item switches from a report view summarizing risk ratings for multiple items of a family to a report summarizing risk ratings for the single item. Examples of various levels of detail are shown in FIGS. 4A-4E, which are discussed below. Further, colors can be added to the reports to indicate Pass (e.g., green), Fail (e.g., red) and data not collected (e.g., amber).

Reports generated in step 220 are analyzed in step 222 by members of business owner team 112 and/or evaluation team 114. The various selectable summary levels of the reports allow risk analysis via multiple approaches (e.g., from a broad, strategic approach of an executive to a detailed, tactical approach of operational personnel). Thus, the reports generated in step 220 are useful to various levels of a business's organizational hierarchy for mitigating the risks identified in step 204. Following the analysis of the reports, appropriate team(s) and/or other persons in the business organization take action based on the analysis to eliminate specific risks so that a risk level is at an acceptable level. As used herein, a risk level is a set of risk ratings that are compared to predetermined associated values to determine if risk mitigation or risk monitoring is required. If the risk ratings in the set are less than or equal to their predetermined associated values, the risk level is at an acceptable level, and no further risk mitigating or monitoring actions are needed. If at least one of the risk ratings in the set is greater than its predetermined value, the risk level is not at an acceptable level, and further action is required to mitigate or monitor one or more risks. Inquiry step 224 determines if the current risk level is acceptable. If the determined risk level is not acceptable, the risks are re-evaluated at step 216 and the process continues through steps 218, 220 and 222. By repeating these steps, changes in risk ratings (e.g., progress in mitigating risks) can be tracked over time. If inquiry step 224 determines that the current risk level is acceptable, then the process of facilitating risk analysis ends at step 226.

Figure 2B:
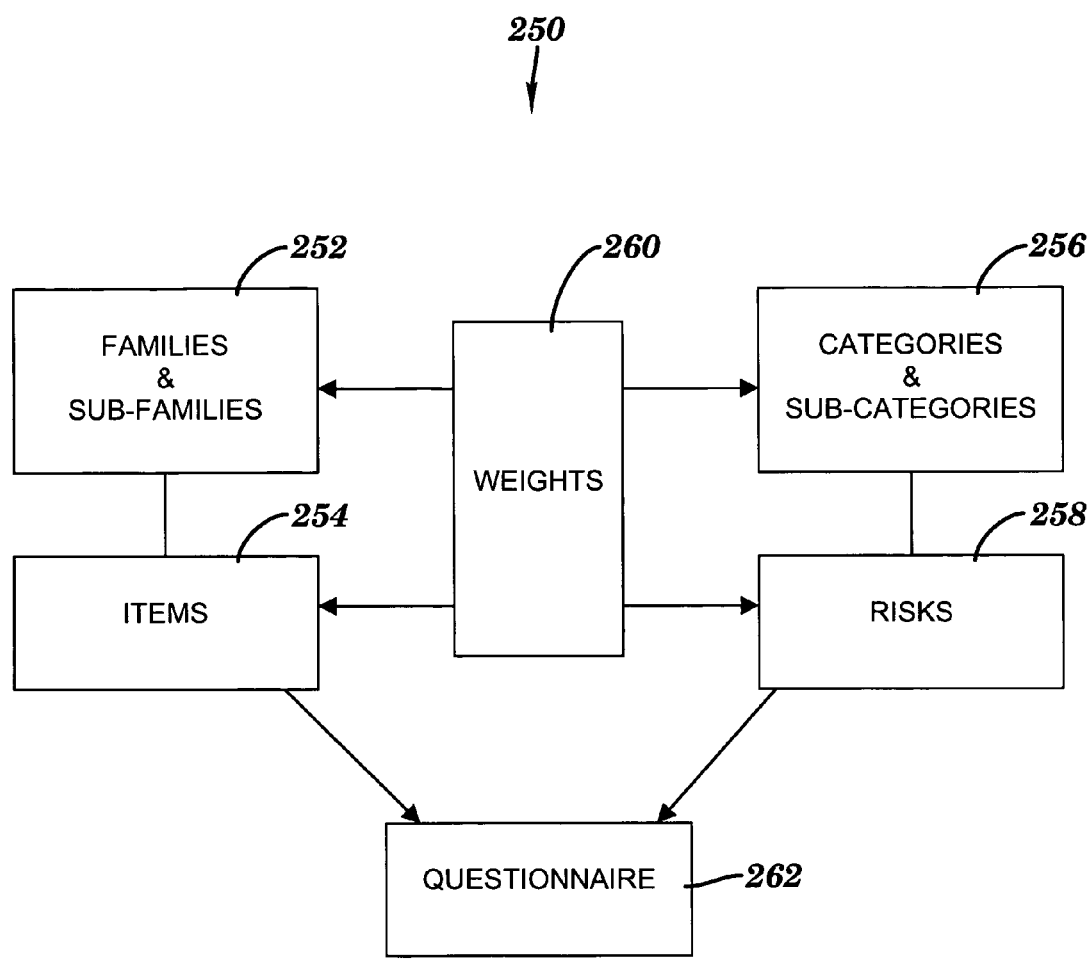
FIG. 2B is a data organization block diagram depicting the flow of data for the system of FIG. 1A, in accordance with embodiments of the present invention.

FIG. 2B is a data organization block diagram depicting the flow of data for the system of FIG. 1A, in accordance with embodiments of the present invention. Data organization 250 comprises two hierarchies: (1) the hierarchy of families and sub-families 252 and the items 254 that are included in the families/sub-families 252; and (2) the hierarchy of categories and sub-categories 256 and the risks 258 included in the categories/sub-categories 256. Weight data 260 is assigned to families/sub-families 252, items 254, categories/sub-categories 256, and risks 258. As described above, for each item 254, a questionnaire 262 is generated to store responses to questions formulated to indicate the risks 258 associated with the item.

Example of Facilitating Risk Analysis

As one example of employing the process described above relative to FIG. 2A, a company selling products over the Internet is interested in analyzing risks associated with its hardware infrastructure and sets up the teams shown in FIG. 1B. In step 202 (see FIG. 2A), business owner team 112 (see FIG. 2A) identifies items in the scope of interest to be computer servers and applications that support the company's Internet-based sales, with the assumption that there is one server per application. In step 204 (see FIG. 2A), evaluation team 114 (see FIG. 2A) identifies risks associated with disk storage, tape storage, process and other documentation, technical and end user support, etc. A portion of these identified risks are formulated as questions listed under the Definition column of questionnaire 300 in FIG. 3. In step 208 (see FIG. 2A), evaluation team 114 (see FIG. 2A) groups the identified risks into three categories: (1) Redundancy and Recovery, (2) Monitoring and Planning, and (3) Documentation and Asset Management. Sub-categories branching from each of the three categories are also identified. Each sub-category is populated with at least one risk of the identified risks. For example, risks associated with CPU, disk and memory performance monitoring are grouped in a sub-category named Capacity Planning, which is associated with the Monitoring and Planning category. Further, under the Redundancy and Recovery category, backup-related risk factors are grouped into sub-categories Application Backup, Database Backup, and Configuration Backup. Also under the Redundancy and Recovery category, redundancy-related risks are grouped into sub-categories Component Redundancy, Network Redundancy, Power Redundancy and Server Redundancy.

At step 208 (see FIG. 2A) in this example, business owner team 112 (see FIG. 2A) identifies, collects and summarizes a large amount of relevant business environment data to be used by the evaluation team. The collected data notes that website availability, website responsiveness, end user support, data security and cost are significant to the company's customers' satisfaction, with website availability being ranked as the highest priority. Based on its knowledge of website availability having the highest priority, joint team 116 (see FIG. 2A) assigns the greatest weights in step 210 (see FIG. 2A) to server backups and redundancy.

At step 212 (see FIG. 2A), business owner team 112 (see FIG. 2A) groups the computer servers identified in step 202 (see FIG. 2A) into sub-families based on the software applications the servers supported. Further, the applications are grouped into families by similarity of function. For example, applications supporting business to business sales are grouped into one family and applications supporting sales directly to consumers are grouped into another family.

In this example, business to business sales generate 80% of the revenue of Internet-based sales for the company. If weights assigned to items and item families/sub-families in step 214 (see FIG. 2A) were objectively determined, the generated revenue could determine a weight for business to business applications higher than the weight of consumer sales applications. The CEO of the company, however, has determined that future emphasis is to be placed on direct to consumer sales, and that this emphasis should offset the objective measurement of revenue. Thus, in step 214 (see FIG. 2A), applications supporting direct to consumer sales are weighted higher than the business to business sales applications.

In step 216 (see FIG. 2A), a questionnaire including responses to risk-related questions are evaluated for one application named Canada's (hereinafter, simply "Canada") in this example. By comparing the responses to predetermined acceptable responses, the questionnaire determines that 27 of 53 responses are not acceptable (i.e., they are deemed Fail responses or Fail indications). FIG. 3 depicts the portion of the questionnaire used in this example that includes questions and responses related to the Redundancy and Recovery category (i.e., 19 of the 53 total questions and responses). A risk rating for the Canada application is determined in step 218 (see FIG. 2A) by adding the weights of the risks associated with the 27 Fail responses, and multiplying the result by the weight assigned to the application. To calculate a risk rating in step 218 (see FIG. 2A) for the family named Personal Solutions that includes the Canada application, risk ratings for the other applications in the Personal Solutions family are computed as described above, and are added together with the risk rating of Canada. This sum of risk ratings of applications grouped in one family (i.e., the Personal Solutions family) is then multiplied by the weight assigned to the family, which results in a risk rating for the Personal Solutions family, which can be compared to similarly calculated risk ratings of other families.

In step 220 (see FIG. 2A), risk rating summaries for this example are generated in reports provided by, for example, a software application running on computing system 106 (see FIG. 1A). Examples of reports generated by step 220 (see FIG. 2A) are depicted in screen captures depicted in FIGS. 4A-4F.

FIG. 4A depicts an abbreviated screen capture 400 that includes risk ratings as responses to risk-related questions for a single application. Although not completely shown, screen 400 includes a full list of questions and responses from the questionnaire in step 216 (see FIG. 2A), organized by the three categories of this example and their respective sub-categories, as described above. Risks identified in step 204 (see FIG. 2A) are formulated as questions in a Definition column in screen 400 of FIG. 4A, which corresponds to the Definitions column of the questionnaire of step 216 (see FIG. 2A) that is partially depicted in FIG. 3. Responses to the questions are included in the Value column and Pass or Fail is indicated in the "Acceptable?" column to indicate if the response is a predetermined acceptable response or not, respectively. Also in the Acceptable column is a number in parentheses, which indicates the weight assigned to the risk associated with the question in the Definition column. The Measurement column indicates the measurement or other descriptive information relative to a question in the Definition column. Further, the risks are grouped according to sub-categories (i.e., the Subcategories column) and categories (i.e., the Categories column). If at least one risk is associated with a Fail indication for a category, a Fail indication is listed on the row below the name of the category. For example, "Fail" is displayed below "Redundancy and Recovery" because at least one risk (i.e., 13 risks in the Redundancy and Recovery category) is associated with a Fail indication. Although not shown, if all risks associated with a category are associated with a Pass indication, then "Pass" would be displayed under the name of the category.

Figure 4B:
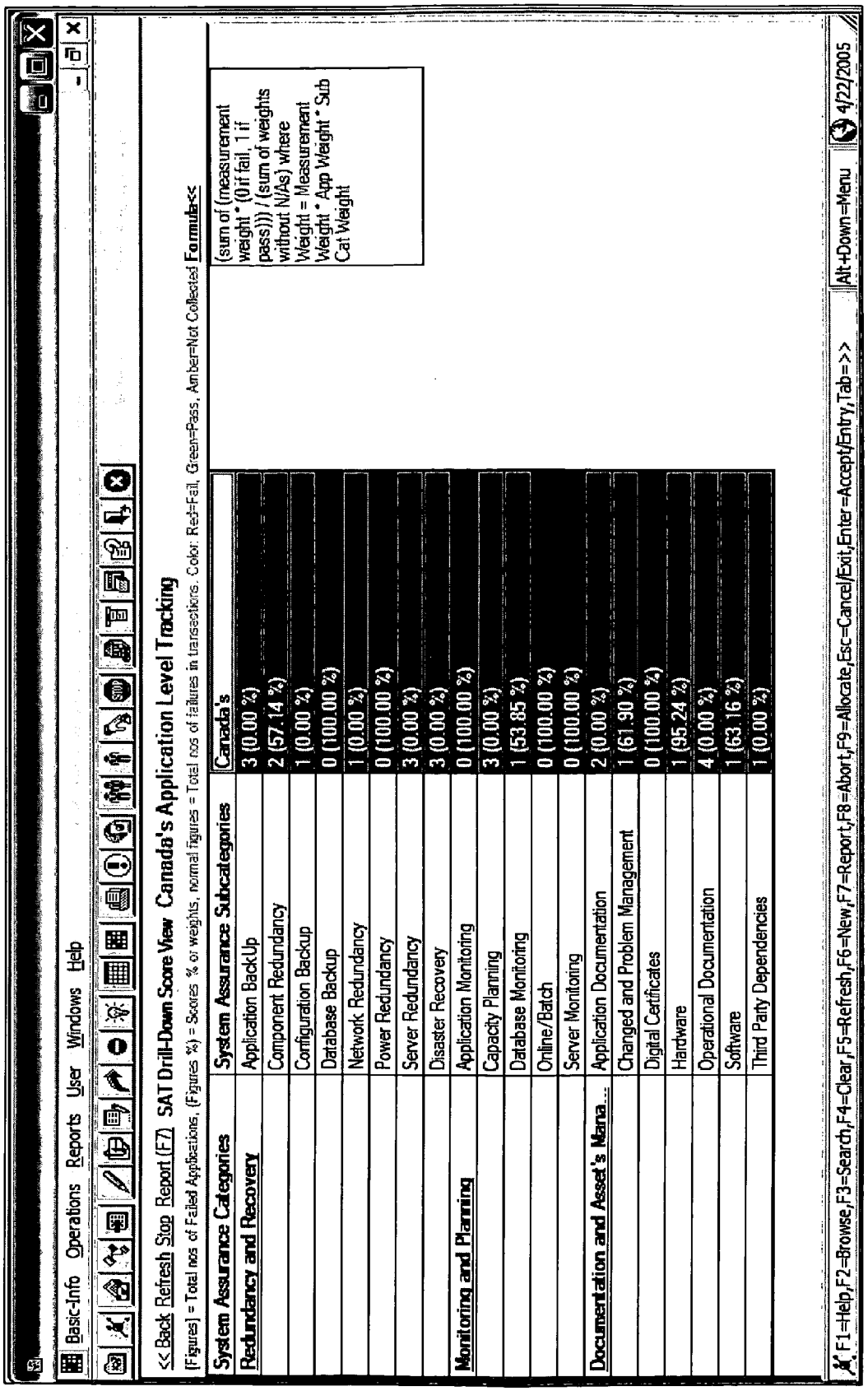

FIG. 4B depicts a screen 410 that includes risk ratings of a single application (i.e., Canada) grouped by sub-categories. For each sub-category, the risk ratings include a number of risks with Fail indications and a weighted percentage of Pass indications. For example, the weighted percentage is computed by the formula:

(Sum of(measurement weight*(0 if fail,1 if pass)))/
(sum of weights without N/As)where
weight=measurement weight*app weight*sub cat weight In the formula presented above, the measurement weight is the weight assigned to a risk, the app weight is the weight assigned to an application (i.e., item) associated with the risk, and the sub cat weight is the weight assigned to a sub-category that includes the risk. N/A indicates that information (e.g., a weight value) is not available, so "without N/As" in the formula indicates that the sum of weights calculation ignores weights associated with N/A rather than with a weight value. N/A is similarly used in the formulas associated with FIGS. 4C-4F, as described below.

Figure 4C:
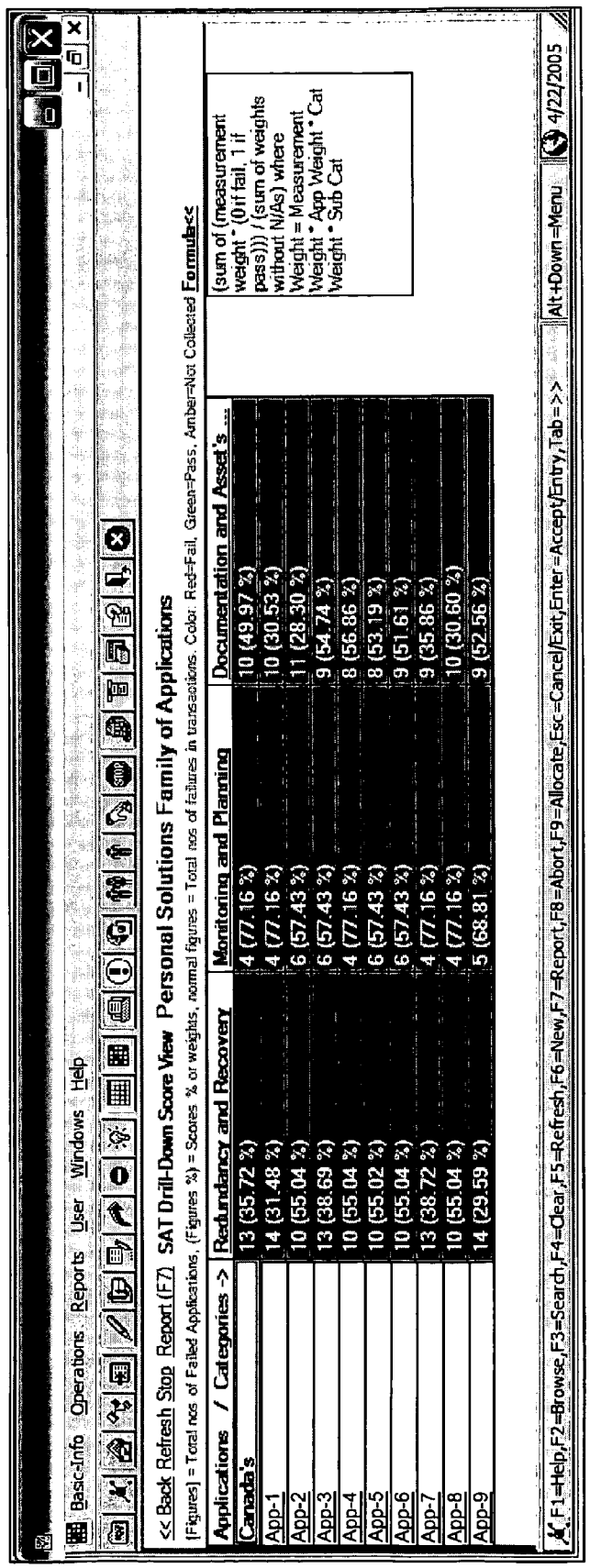

FIG. 4C depicts a screen 420 that includes a summary of risk ratings for multiple applications within the Personal Solutions family of applications. For each of the multiple applications, the risk ratings are grouped by category. For each application, the risk ratings include a Fail indication total and a weighted Pass percentage summarized in each category. For example, the weighted Pass percentage is computed by the formula:

(Sum of(measurement weight*(0 if fail,1 if pass)))/
(sum of weights without N/As)where
weight=measurement weight*app weight*cat weight*sub cat weight The formula presented above includes the values as indicated in the formula described relative to FIG. 4B, with the addition of cat weight, which is the weight assigned to the category associated with the sub cat currently being applied in the computation.

Figure 4D:
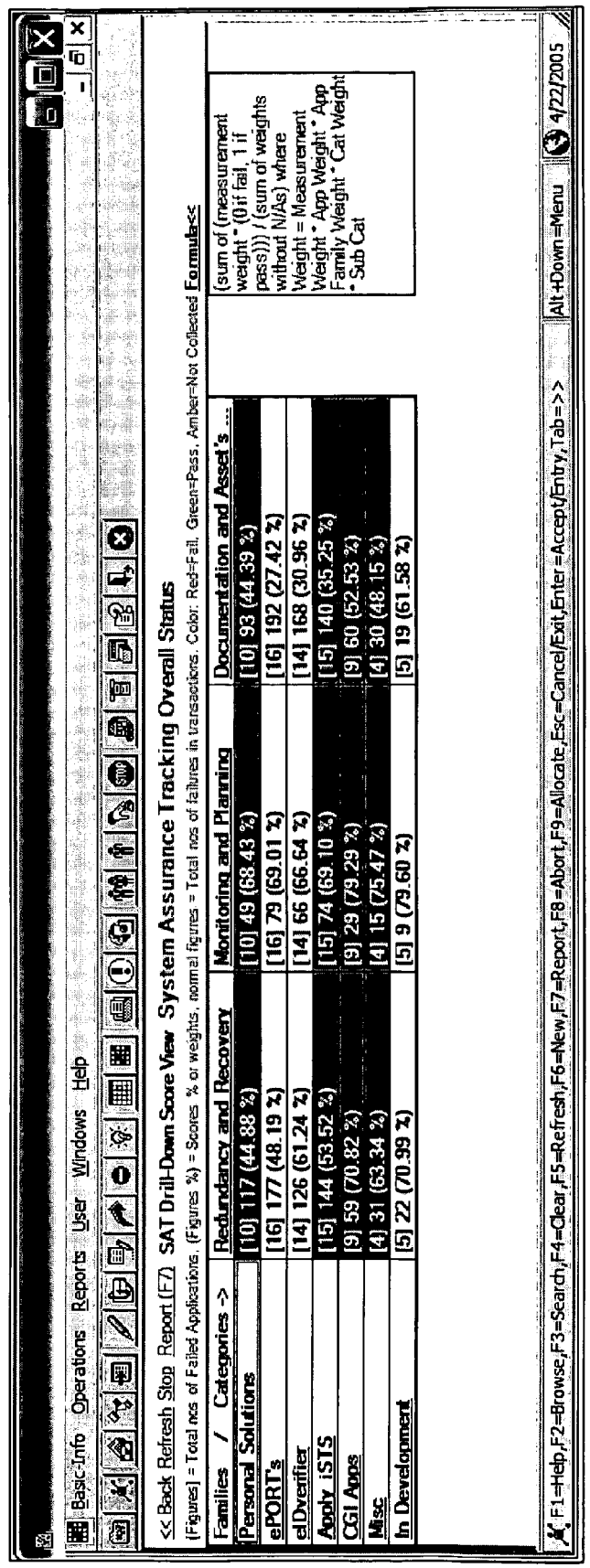

FIG. 4D depicts a screen 430 that includes a summary of risk ratings for multiple families of applications. For each family, risk ratings are grouped by category. The risk ratings in FIG. 4D include a number in brackets indicating the number of applications within the indicated family that are associated with a Fail indication for a particular category. For example, the [10] included in the Personal Solutions row under the Redundancy and Recovery column indicates that ten applications in the Personal Solutions family are associated with a Fail indication for the Redundancy and Recovery category. Therefore, if a summary report similar to FIG. 4A was displayed for each of the applications in the Personal Solutions family, ten of the reports would indicate "Fail" under the Redundancy and Recovery category name.

The risk ratings in FIG. 4D further include a total number of Fail indications and a weighted Pass percentage summarized for each category. For example, the weighted Pass percentage is computed by the formula:

(Sum of(measurement weight*(0 if fail,1 if pass)))/
(sum of weights without N/As)where
weight=measurement weight*app weight*app
family weight*cat weight*sub cat weight The formula presented above includes the values as indicated in the formulas described relative to FIGS. 4B and 4C, with the addition of app family weight, which is the weight assigned to the family associated with the app weight currently being applied in the computation.

Figure 4E:
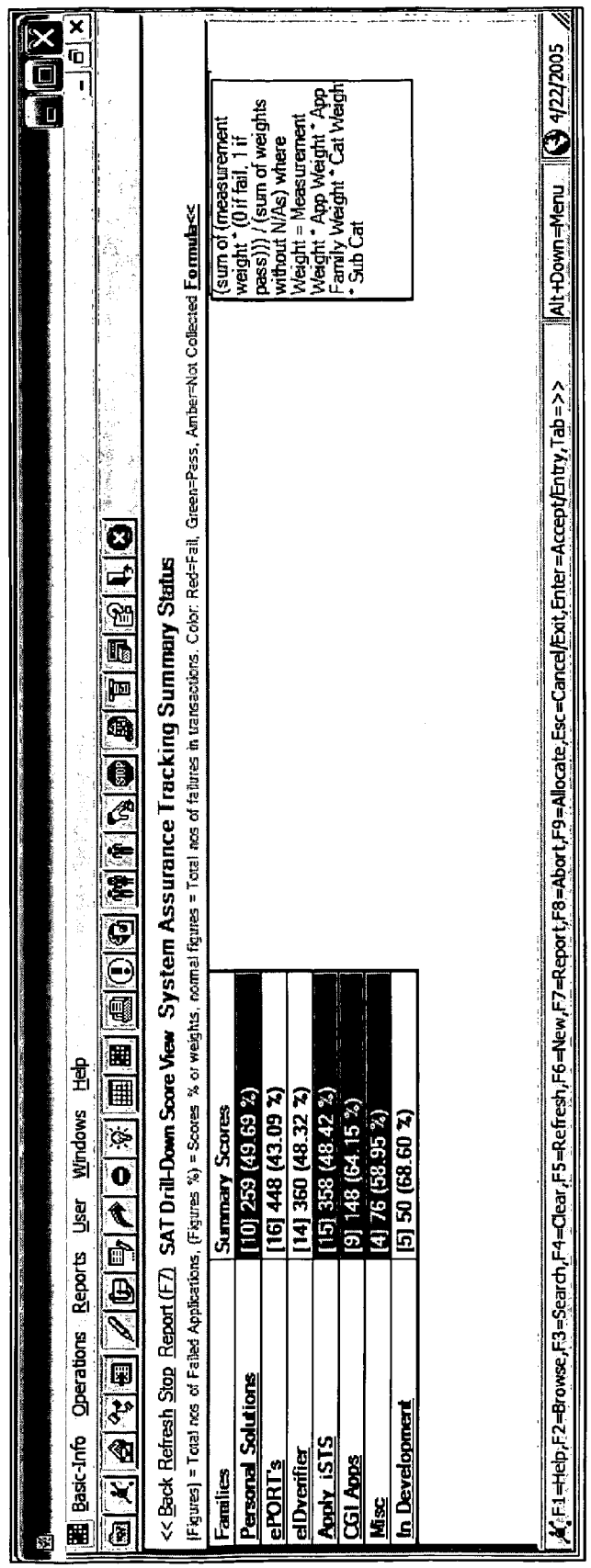

FIG. 4E depicts a screen 440 that includes a summary of risk ratings for multiple families of applications. For each family, total risk ratings are displayed. The risk ratings in FIG. 4E include a number in brackets indicating the number of applications within the indicated family that are associated with at least one Fail indication. The risk ratings in FIG. 4E further include a number without brackets, which is a total number of Fail indications, as well as a total weighted Pass percentage associated with the indicated family. For example, computing the weighted Pass percentage in FIG. 4E employs the following formula and sums across the categories to obtain a single percentage for each family:

(Sum of(measurement weight*(0 if fail,1 if pass)))/
(sum of weights without N/As)where
weight=measurement weight*app weight*app
family weight*cat weight*sub cat weight The formula presented above includes the values as indicated in the formulas described above relative to FIGS. 4B, 4C and 4D.

Figure 4F:
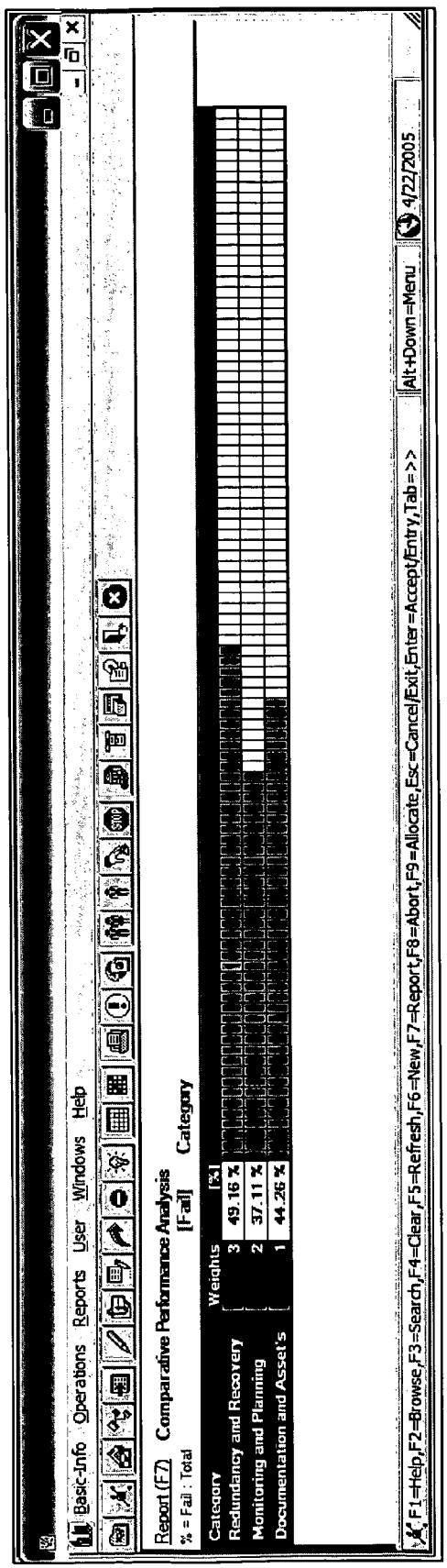

FIG. 4F depicts a screen 450 that includes a summary of risk ratings for categories ordered by weights assigned to the categories. For example, since the Redundancy and Recovery category has been assigned the highest weight (i.e., 3 in the Weights column of FIG. 4F), it is listed first on the report. The risk ratings on screen 450 include a weighted Fail percentage associated with each category. The weighted Fail percentage indicates a percentage of Fail indications of risks associated with each category. For example, computing the weighted Fail percentage in FIG. 4F employs the following formula and sums across the families to obtain a single percentage for each category:

(Sum of(measurement weight*(1 if fail,0 if pass)))/
(sum of weights without N/As)where
weight=measurement weight*app weight*app
family weight*cat weight*sub cat weight The formula presented above includes the values as indicated in the formulas described relative to FIGS. 4B, 4C and 4D.

One or more of the above-described reports of FIGS. 4A-4F are analyzed in step 222 (see FIG. 2A) by business owner team 112 (see FIG. 2A) and evaluation team 114 (see FIG. 2A), which set up projects that include actions to reduce the number of risks identified in step 204 (see FIG. 2A) to a level that is predetermined (e.g., by the business owner team) to be acceptable. For example, projects are organized so that each project addresses an individual risk associated with all items of the defined scope. In the case of consumer sales, all of the associated risks are to be addressed in a single project. As an additional example, since the Redundancy and Recovery category in FIG. 4F has the highest Fail percentage, analysis of this report can lead to an executive-level decision to devote additional resources to address elimination of risks associated with Redundancy and Recovery. After action is taken to reduce risks, inquiry step 224 (see FIG. 2A) determines if the risk level is acceptable. If the risk level is not at an acceptable level, the part of the process starting at step 216 (see FIG. 2A) is repeated; otherwise, the process ends at step 226 (see FIG. 2A).

Computer System for Facilitating Analysis of Risks

Figure 5:
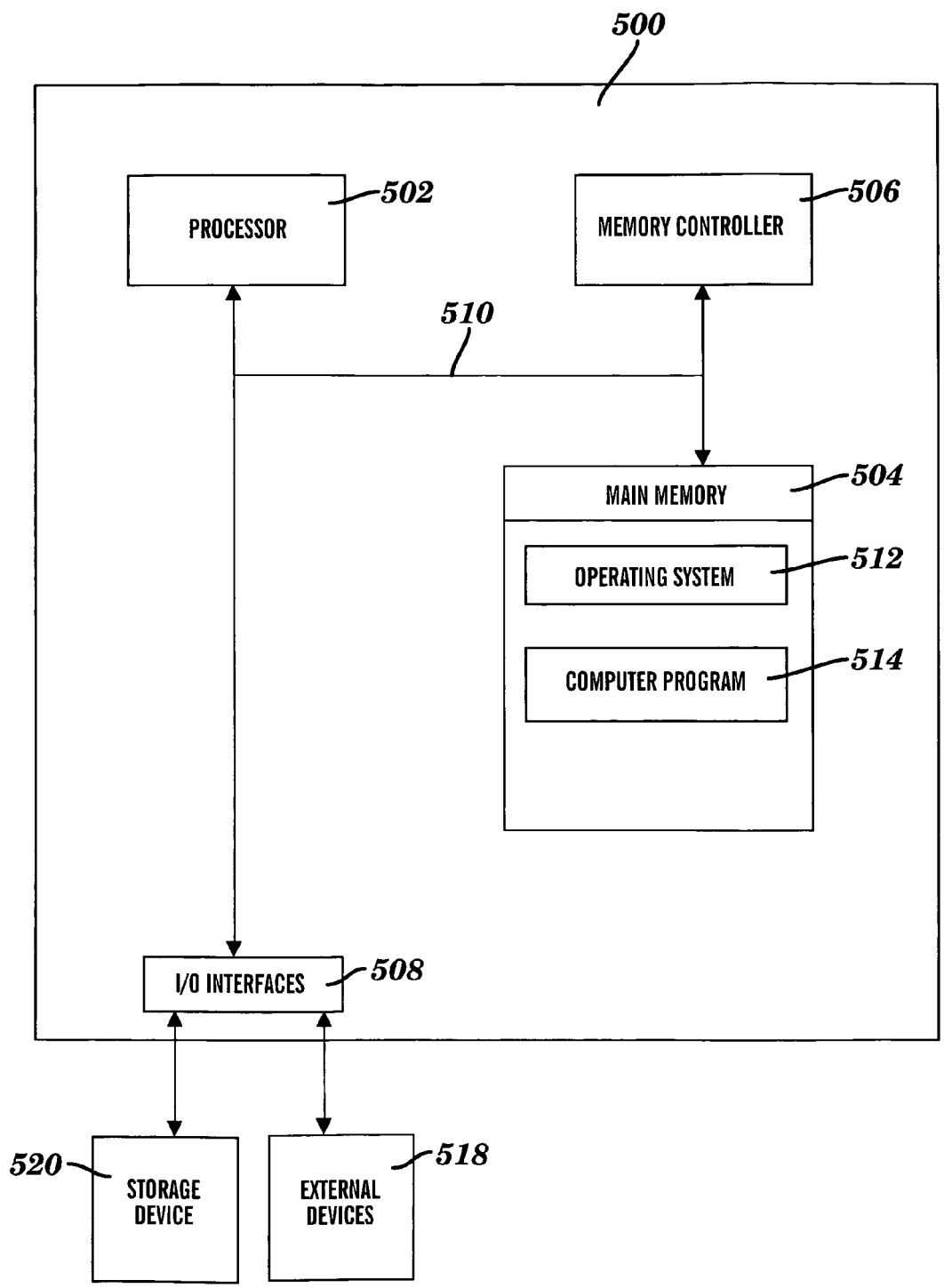
FIG. 5 depicts a computer system for implementing the facilitation of analysis of risks for the system of FIG. 1A, in accordance with embodiments of the present invention.

FIG. 5 depicts a computer system for implementing the facilitation of analysis of risks for the system of FIG. 1A, in accordance with embodiments of the present invention. Computer system 500 suitably comprises a processor 502, a main memory 504, a memory controller 506, and at least one input/output (I/O) interface 508, all of which are interconnected via a system bus 510. Main memory 504 includes an operating system 512, a computer program 514, and a compiler 516. Main memory 504 includes an algorithm including the risk analysis facilitation logic depicted in the flow chart of FIG. 2A. In one embodiment, computer program 514 includes an algorithm of the logic of FIG. 2A. Operating system 512 is, for example, Microsoft Windows. Data relevant to the aforementioned facilitation of analysis of risks (e.g., questionnaire information, weights, risks, items, etc.) is stored on one or more databases (not shown) connected to computer system 500. The relevant data and other data are transmitted between the one or more databases and computer system 500. The one or more databases are, for example, Microsoft SQL databases.

Processor 502 performs computation and control functions of computer system 500, and comprises a suitable central processing unit. Processor 502 may comprise a single integrated circuit, such as a microprocessor, or may comprise any suitable number of integrated circuit devices and/or circuit boards working in cooperation to accomplish the functions of a processor. Processor 502 suitably executes one or more computer programs, including computer program 514, within main memory 504. In one embodiment, processor 502 executes an algorithm implementing the logic depicted in the flow chart of FIG. 2A.

I/O interfaces 508 may comprise any system for exchanging information from external sources such as external devices 518. External devices 518 may comprise conventional external devices including a display monitor, keyboard, mouse, printer, plotter, facsimile, etc. Computer system 500 can be connected to one or more other computers via a communication interface using an appropriate communication channel (not shown) such as a modem communications path, a computer network, or the like. The computer network (not shown) may include a local area network (LAN), a wide area network (WAN), Intranet, and/or the Internet.

I/O interfaces 508 also allow computer system 500 to store and retrieve information (e.g., program instructions or data) from an auxiliary storage device 520, such as a non-volatile storage device, which can be, for example, a CD-ROM drive which receives a CD-ROM disk (not shown). Computer system 500 can store and retrieve information from other auxiliary storage devices (not shown), which can include a direct access storage device (DASD) (e.g., hard disk or floppy diskette), a magneto-optical disk drive, a tape drive, or a wireless communication device. Memory controller 506, through use of a processor (not shown) separate from processor 502, is responsible for moving requested information from main memory 504 and/or through I/O interfaces 508 to processor 502. While for the purposes of explanation, memory controller 506 is shown as a separate entity, those skilled in the art understand that, in practice, portions of the function provided by memory controller 506 may actually reside in the circuitry associated with processor 502, main memory 504, and/or I/O interfaces 508.

It should be understood that main memory 504 will not necessarily contain all parts of all mechanisms shown. For example, portions of computer program 514 and operating system 512 may be loaded into an instruction cache (not shown) for processor 502 to execute, while other files may well be stored on magnetic or optical disk storage devices, such as storage device 520. In addition, although computer program 514 is shown to reside in the same memory location as operating system 512, it is to be understood that main memory 504 may consist of disparate memory locations.

A terminal interface of I/O interfaces 508 allows system administrators and computer programmers to communicate with computer system 500. Although computer system 500 depicted in FIG. 5 contains only a single main processor 502 and a single system bus 510, it should be understood that the present invention applies equally to computer systems having multiple processors and multiple system buses. Similarly, although system bus 510 is a typical hardwired, multidrop bus, any connection means that supports bi-directional communication in a computer-related environment could be used.

A computer system 500 in accordance with the present invention is, for example, a personal computer. However, those skilled in the art will appreciate that the methods and apparatus of the present invention apply equally to any computer system, regardless of whether the computer system is a complicated multi-user computing apparatus or a single user device such as a workstation. In one embodiment, computer system 500 is a personal computer with the capability of acting as a database server for the one or more databases (not shown) described above. In another embodiment, one or more database server computing units external to, and in communication with, computer system 500 act as the backend for the one or more databases described above.

Note that various modifications, additions, or deletions may be made to computer system 500 illustrated in FIG. 5 within the scope of the present invention such as the addition of cache memory or other peripheral devices. FIG. 5 is presented to simply illustrate some of the salient features of computer system 500.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks and CD-ROMs, and transmission type media such as digital and analog communication links, including wireless communication links.

Thus, the present invention discloses a method for deploying or integrating computing infrastructure, comprising integrating computer-readable code into computer system 500, wherein the code in combination with computer system 500 is capable of performing a process of facilitating analysis of risks.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of summarizing risk ratings to facilitate an analysis of risks, said method comprising:

weighting, by a computing system, each item of a plurality of items and each family of a plurality of families, wherein each family of said plurality of families includes one or more items of said plurality of items, and wherein said plurality of items are related to each other by a common functionality;

weighting, by said computing system, each risk of a plurality of risks, each sub-category of a plurality of sub-categories and each category of a plurality of categories, said weighting each risk determining a weight for each risk, wherein each category of said plurality of categories includes one or more sub-categories of said plurality of sub-categories, and wherein said plurality of risks is associated with each item of said plurality of items;

generating, by said computing system, a questionnaire report that includes a plurality of questions, wherein said questionnaire report corresponds to an item of said plurality of items, wherein said plurality of risks is formulated as said plurality of questions, and wherein said questions of said plurality of questions are associated with predetermined answers of a plurality of predetermined answers;

evaluating, by said computing system, said plurality of risks for each item of said plurality of items, wherein said evaluating includes:

receiving a plurality of responses for said plurality of questions;

said computing system comparing said plurality of responses to said plurality of predetermined answers; and said computing system determining that one or more responses of said plurality of responses are acceptable based on a result of said comparing said plurality of responses, wherein said questionnaire report includes a column that includes one or more indications that indicate said one or more responses are acceptable, each indication indicating that a corresponding response of said one or more responses is acceptable, wherein said questionnaire report associates said one or more responses with one or more risks of said plurality of risks, and wherein said one or more risks are included in a category of said plurality of categories;

calculating, by a processor of said computing system, a first summarized risk rating summarized by said category, wherein said first summarized risk rating summarized by said category is included in a first set of summarized risk ratings that are associated with said item and with said plurality of categories, wherein said first summarized risk rating summarized by said category includes a weighted percentage of said one or more indications, wherein said first summarized risk rating summarized by said category is a first weight of said category multiplied by a sum of one or more summarized risk ratings for a set of one or more sub-categories included in said category, wherein a summarized risk rating for a sub-category of said set of one or more sub-categories is included in said one or more summarized risk ratings for said set of one or more sub-categories and is a second weight of said sub-category multiplied by a risk rating of said item, wherein said risk rating of said item is a third weight of said item multiplied by a sum of one or more weights of said one or more risks, wherein said first weight and said second weight are a result of said weighting each sub-category of said plurality of sub-categories and each category of said plurality of categories, and wherein said third weight is a result of said weighting each item of said plurality of items;

displaying, by said computing system, a first summary report, wherein said first summary report includes said first summarized risk rating and other summarized risk ratings of said first set of summarized risk ratings, wherein said first summary report groups said summarized risk ratings of said first set of summarized risk ratings by said categories of said plurality of categories, wherein said first summary report includes a hyperlink, and wherein a result of said displaying said first summary report is a first analysis by a first team consisting of a first plurality of persons whose responsibility is to meet a plurality of objectives using said plurality of items pre-identified by said first team as being in a scope of an evaluation of said plurality of risks;

receiving, by said computing system, a selection of said hyperlink;

calculating, by said processor of said computing system, a second summarized risk rating summarized by said sub-category, wherein said second summarized risk rating summarized by said sub-category is included in a second set of summarized risk ratings that are associated with said item and with said plurality of sub-categories, and wherein said second summarized risk rating summarized by said sub-category is said second weight of said sub-category multiplied by said risk rating of said item;

automatically displaying, by said computing system and in response to said receiving said selection of said hyperlink, a second summary report, wherein said second summary report includes said second summarized risk rating and other summarized risk ratings of said second set of summarized risk ratings, wherein said second summary report groups said summarized risk ratings of said second set of summarized risk ratings by said sub-categories of said plurality of sub-categories, wherein a result of said automatically displaying is a second analysis by a second team consisting of a second plurality of persons whose responsibility is to identify and evaluate said plurality of risks, wherein said plurality of risks is specific to said scope, and wherein said first team is different from said second team;

said computing system determining said first summarized risk rating is greater than a first predetermined value based on said first analysis;

said computing system determining said second summarized risk rating is greater than a second predetermined value based on said second analysis;

in response to said determining said first summarized risk rating is greater than said first predetermined value, said computing system performing a first action so as to mitigate a first risk of said one or more risks and to decrease said first summarized risk rating to an updated first summarized risk rating that is less than or equal to said first predetermined value; and in response to said determining said second summarized risk rating is greater than said second predetermined value, said computing system performing a second action so as to mitigate a second risk of said one or more risks and to decrease said second summarized risk rating to an updated second summarized risk rating that is less than or equal to said second predetermined value.

2. A computing system comprising a processor and a computer-readable memory unit coupled to said processor, said memory unit containing instructions that when executed by said processor implement a method of summarizing risk ratings to facilitate an analysis of risks, wherein said method comprises:

weighting each item of a plurality of items and each family of a plurality of families, wherein each family of said plurality of families includes one or more items of said plurality of items, and wherein said plurality of items are related to each other by a common functionality;

weighting each risk of a plurality of risks, each sub-category of a plurality of sub-categories and each category of a plurality of categories, said weighting each risk determining a weight for each risk, wherein each category of said plurality of categories includes one or more sub-categories of said plurality of sub-categories, and wherein said plurality of risks is associated with each item of said plurality of items;

generating a questionnaire report that includes a plurality of questions, wherein said questionnaire report corresponds to an item of said plurality of items, wherein said plurality of risks is formulated as said plurality of questions, and wherein said questions of said plurality of questions are associated with predetermined answers of a plurality of predetermined answers;

evaluating said plurality of risks for each item of said plurality of items, wherein said evaluating includes:
receiving a plurality of responses for said plurality of questions;
comparing said plurality of responses to said plurality of predetermined answers; and
determining that one or more responses of said plurality of responses are acceptable based on a result of said comparing said plurality of responses, wherein said questionnaire report includes a column that includes one or more indications that indicate said one or more responses are acceptable, each indication indicating that a corresponding response of said one or more responses is acceptable, wherein said questionnaire report associates said one or more responses with one or more risks of said plurality of risks, and wherein said one or more risks are included in a category of said plurality of categories;

calculating, by said computing system, a first summarized risk rating summarized by said category, wherein said first summarized risk rating summarized by said category is included in a first set of summarized risk ratings that are associated with said item and with said plurality of categories, wherein said first summarized risk rating summarized by said category includes a weighted percentage of said one or more indications, wherein said first summarized risk rating summarized by said category is a first weight of said category multiplied by a sum of one or more summarized risk ratings for a set of one or more sub-categories included in said category, wherein a summarized risk rating for a sub-category of said set of one or more sub-categories is included in said one or more summarized risk ratings for said set of one or more sub-categories and is a second weight of said sub-category multiplied by a risk rating of said item, wherein said risk rating of said item is a third weight of said item multiplied by a sum of one or more weights of said one or more risks, wherein said first weight and said second weight are a result of said weighting each sub-category of said plurality of sub-categories and each category of said plurality of categories, and wherein said third weight is a result of said weighting each item of said plurality of items;

displaying a first summary report, wherein said first summary report includes said first summarized risk rating and other summarized risk ratings of said first set of summarized risk ratings, wherein said first summary report groups said summarized risk ratings of said first set of summarized risk ratings by said categories of said plurality of categories, wherein said first summary report includes a receiving a selection of said hyperlink;

calculating a second summarized risk rating summarized by said sub-category, wherein said second summarized risk rating summarized by said sub-category is included in a second set of summarized risk ratings that are associated with said item and with said plurality of sub-categories, and wherein said second summarized risk rating summarized by said sub-category is said second weight of said sub-category multiplied by said risk rating of said item;

automatically displaying, in response to said receiving said selection of said hyperlink, a second summary report, wherein said second summary report includes said second summarized risk rating and other summarized risk ratings of said second set of summarized risk ratings, and wherein said second summary report groups said summarized risk ratings of said second set of summarized risk ratings by said sub-categories of said plurality of sub-categories;

determining said first summarized risk rating is greater than a first predetermined value based on said first analysis;

determining said second summarized risk rating is greater than a second predetermined value based on said second analysis;

in response to said determining said first summarized risk rating is greater than said first predetermined value, performing a first action so as to mitigate a first risk of said one or more risks and to decrease said first summarized risk rating to an updated first summarized risk rating that is less than or equal to said first predetermined value; and in response to said determining said second summarized risk rating is greater than said second predetermined value, performing a second action so as to mitigate a second risk of said one or more risks and to decrease said second summarized risk rating to an updated second summarized risk rating that is less than or equal to said second predetermined value.

3. A computer program product, comprising a non-transitory computer-usable medium having a computer-readable program code embodied therein, said computer-readable program code containing instructions that when executed by a processor of a computing system implement a method of summarizing risk ratings to facilitate an analysis of risks, wherein said method comprises:

weighting each item of a plurality of items and each family of a plurality of families, wherein each family of said plurality of families includes one or more items of said plurality of items, and wherein said plurality of items are related to each other by a common functionality;

weighting each risk of a plurality of risks, each sub-category of a plurality of sub-categories and each category of a plurality of categories, said weighting each risk determining a weight for each risk, wherein each category of said plurality of categories includes one or more sub-categories of said plurality of sub-categories, and wherein said plurality of risks is associated with each item of said plurality of items;

generating a questionnaire report that includes a plurality of questions, wherein said questionnaire report corresponds to an item of said plurality of items, wherein said plurality of risks is formulated as said plurality of questions, and wherein said questions of said plurality of questions are associated with predetermined answers of a plurality of predetermined answers;

evaluating said plurality of risks for each item of said plurality of items, wherein said evaluating includes:
  receiving a plurality of responses for said plurality of questions;
  comparing said plurality of responses to said plurality of predetermined answers;
  determining that one or more responses of said plurality of responses are acceptable based on a result of said comparing said plurality of responses, wherein said questionnaire report includes a column that includes one or more indications that indicate said one or more responses are acceptable, each indication indicating that a corresponding response of said one or more responses is acceptable, wherein said questionnaire report associates said one or more responses with one or more risks of said plurality of risks, and wherein said one or more risks are included in a category of said plurality of categories;

calculating, by said computing system, a first summarized risk rating summarized by said category, wherein said first summarized risk rating summarized by said category is included in a first set of summarized risk ratings that are associated with said item and with said plurality of categories, wherein said first summarized risk rating summarized by said category includes a weighted percentage of said one or more indications, wherein said first summarized risk rating summarized by said category is a first weight of said category multiplied by a sum of one or more summarized risk ratings for a set of one or more sub-categories included in said category, wherein a summarized risk rating for a sub-category of said set of one or more sub-categories is included in said one or more summarized risk ratings for said set of one or more sub-categories and is a second weight of said sub-category multiplied by a risk rating of said item, wherein said risk rating of said item is a third weight of said item multiplied by a sum of one or more weights of said one or more risks, wherein said first weight and said second weight are a result of said weighting each sub-category of said plurality of sub-categories and each category of said plurality of categories, and wherein said third weight is a result of said weighting each item of said plurality of items;

displaying a first summary report, wherein said first summary report includes said first summarized risk rating and other summarized risk ratings of said first set of summarized risk ratings, wherein said first summary report groups said summarized risk ratings of said first set of summarized risk ratings by said categories of said plurality of categories, wherein said first summary report includes a hyperlink, and wherein a result of said displaying said first summary report is a first analysis by a first team consisting of a first plurality of persons whose responsibility is to meet a plurality of objectives using said plurality of items pre-identified by said first team as being in a scope of an evaluation of said plurality of risks;

receiving a selection of said hyperlink;

calculating a second summarized risk rating summarized by said sub-category, wherein said second summarized risk rating summarized by said sub-category is included in a second set of summarized risk ratings that are associated with said item and with said plurality of sub-categories, and wherein said second summarized risk rating summarized by said sub-category is said second weight of said sub-category multiplied by said risk rating of said item;

automatically displaying, in response to said receiving said selection of said hyperlink, a second summary report, wherein said second summary report includes said second summarized risk rating and other summarized risk ratings of said second set of summarized risk ratings, wherein said second summary report groups said summarized risk ratings of said second set of summarized risk ratings by said sub-categories of said plurality of sub-categories, wherein a result of said automatically displaying is a second analysis by a second team consisting of a second plurality of persons whose responsibility is to identify and evaluate said plurality of risks, wherein said plurality of risks is specific to said scope, and wherein said first team is different from said second team;

determining said first summarized risk rating is greater than a first predetermined value based on said first analysis;

determining said second summarized risk rating is greater than a second predetermined value based on said second analysis;

in response to said determining said first summarized risk rating is greater than said first predetermined value, performing a first action so as to mitigate a first risk of said one or more risks and to decrease said first summarized risk rating to an updated first summarized risk rating that is less than or equal to said first predetermined value; and in response to said determining said second summarized risk rating is greater than said second predetermined value, performing a second action so as to mitigate a second risk of said one or more risks and to decrease said second summarized risk rating to an updated second summarized risk rating that is less than or equal to said second predetermined value.

4. A process for supporting computing infrastructure, said process comprising providing at least one support service for at least one of creating, integrating, hosting, maintaining, and deploying computer-readable code in a computing system comprising a processor, wherein said code, when executed by said processor, causes said computing system to specify a method of summarizing risk ratings to facilitate an analysis of risks, wherein said method comprises:

weighting each item of a plurality of items and each family of a plurality of families, wherein each family of said plurality of families includes one or more items of said plurality of items, and wherein said plurality of items are related to each other by a common functionality;

weighting each risk of a plurality of risks, each sub-category of a plurality of sub-categories and each category of a plurality of categories, said weighting each risk determining a weight for each risk, wherein each category of said plurality of categories includes one or more sub-categories of said plurality of sub-categories, and wherein said plurality of risks is associated with each item of said plurality of items;

generating a questionnaire report that includes a plurality of questions, wherein said questionnaire report corresponds to an item of said plurality of items, wherein said plurality of risks is formulated as said plurality of questions, and wherein said questions of said plurality of questions are associated with predetermined answers of a plurality of predetermined answers;

evaluating said plurality of risks for each item of said plurality of items, wherein said evaluating includes:
  receiving a plurality of responses for said plurality of questions;
  comparing said plurality of responses to said plurality of predetermined answers;
  determining that one or more responses of said plurality of responses are acceptable based on a result of said comparing said plurality of responses, wherein said questionnaire report includes a column that includes one or more indications that indicate said one or more responses are acceptable, each indication indicating that a corresponding response of said one or more responses is acceptable, wherein said questionnaire report associates said one or more responses with one or more risks of said plurality of risks, and wherein said one or more risks are included in a category of said plurality of categories;

calculating, by said computing system, a first summarized risk rating summarized by said category, wherein said first summarized risk rating summarized by said category is included in a first set of summarized risk ratings that are associated with said item and with said plurality of categories, wherein said first summarized risk rating summarized by said category includes a weighted percentage of said one or more indications, wherein said first summarized risk rating summarized by said category is a first weight of said category multiplied by a sum of one or more summarized risk ratings for a set of one or more sub-categories included in said category, wherein a summarized risk rating for a sub-category of said set of one or more sub-categories is included in said one or more summarized risk ratings for said set of one or more sub-categories and is a second weight of said sub-category multiplied by a risk rating of said item, wherein said risk rating of said item is a third weight of said item multiplied by a sum of one or more weights of said one or more risks, wherein said first weight and said second weight are a result of said weighting each sub-category of said plurality of sub-categories and each category of said plurality of categories, and wherein said third weight is a result of said weighting each item of said plurality of items;

displaying a first summary report, wherein said first summary report includes said first summarized risk rating and other summarized risk ratings of said first set of summarized risk ratings, wherein said first summary report groups said summarized risk ratings of said first set of summarized risk ratings by said categories of said plurality of categories, wherein said first summary report includes a hyperlink, and wherein a result of said displaying said first summary report is a first analysis by a first team consisting of a first plurality of persons whose responsibility is to meet a plurality of objectives using said plurality of items pre-identified by said first team as being in a scope of an evaluation of said plurality of risks;

receiving a selection of said hyperlink;

calculating a second summarized risk rating summarized by said sub-category, wherein said second summarized risk rating summarized by said sub-category is included in a second set of summarized risk ratings that are associated with said item and with said plurality of sub-categories, and wherein said second summarized risk rating summarized by said sub-category is said second weight of said sub-category multiplied by said risk rating of said item;

automatically displaying, in response to said receiving said selection of said hyperlink, a second summary report, wherein said second summary report includes said second summarized risk rating and other summarized risk ratings of said second set of summarized risk ratings, wherein said second summary report groups said summarized risk ratings of said second set of summarized risk ratings by said sub-categories of said plurality of sub-categories, wherein a result of said automatically displaying is a second analysis by a second team consisting of a second plurality of persons whose responsibility is to identify and evaluate said plurality of risks, wherein said plurality of risks is specific to said scope, and wherein said first team is different from said second team;

determining said first summarized risk rating is greater than a first predetermined value based on said first analysis;

determining said second summarized risk rating is greater than a second predetermined value based on said second analysis;

in response to said determining said first summarized risk rating is greater than said first predetermined value, performing a first action so as to mitigate a first risk of said one or more risks and to decrease said first summarized risk rating to an updated first summarized risk rating that is less than or equal to said first predetermined value; and in response to said determining said second summarized risk rating is greater than said second predetermined value, performing a second action so as to mitigate a second risk of said one or more risks and to decrease said second summarized risk rating to an updated second summarized risk rating that is less than or equal to said second predetermined value.

* * * * *